United States Patent [19]

Alexander

[11] 4,115,841
[45] Sep. 19, 1978

[54] SEARCHLIGHT

[76] Inventor: Eli James Alexander, 9024 David Ave., Los Angeles, Calif. 90034

[21] Appl. No.: 746,879

[22] Filed: Dec. 2, 1976

[51] Int. Cl.² ............................................. F21M 3/00
[52] U.S. Cl. ..................................... 362/44; 362/49; 362/53; 362/62; 362/66
[58] Field of Search ............... 240/1.2, 7.7, 57, 61.05, 240/61.11, 61.12, 61.6; 362/37, 44, 49, 53, 55, 61, 62, 66, 383

[56] References Cited

U.S. PATENT DOCUMENTS

| | | | |
|---|---|---|---|
| 1,578,025 | 3/1926 | Grigsby | 240/61.12 |
| 2,281,047 | 4/1942 | Pennow | 240/61.05 |
| 2,353,380 | 7/1944 | Adler | 240/7.7 |
| 2,479,176 | 8/1949 | Meese | 240/61.05 |
| 3,307,029 | 2/1967 | Gross | 240/61.6 |
| 3,569,690 | 3/1971 | Nelson | 240/7.7 |

Primary Examiner—Verlin R. Pendegrass
Assistant Examiner—Donald P. Walsh
Attorney, Agent, or Firm—J. B. McGuire

[57] ABSTRACT

A searchlight apparatus which may be mounted on an aircraft, such as a helicopter. The exemplary apparatus comprises a tubular post which may be mounted in the craft for rotation about its axis. A control rod may pass through the post, extending between a bracket which is hinged to the post at the outer end and a handle at the inner end of the post. This control linkage system allows an operator in a helicopter to aim the lamps on a one-to-one ratio merely by aiming the handle.

21 Claims, 20 Drawing Figures

FIG. 1.
FIG. 2.
FIG. 3.
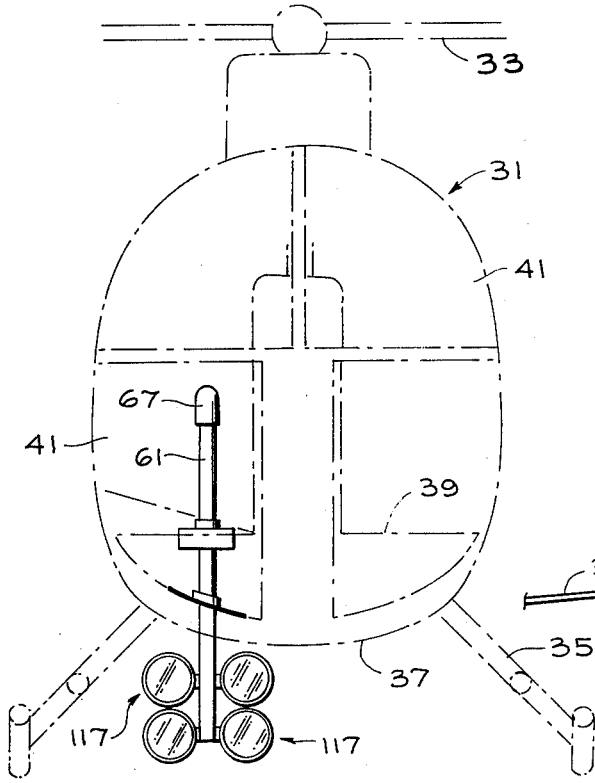
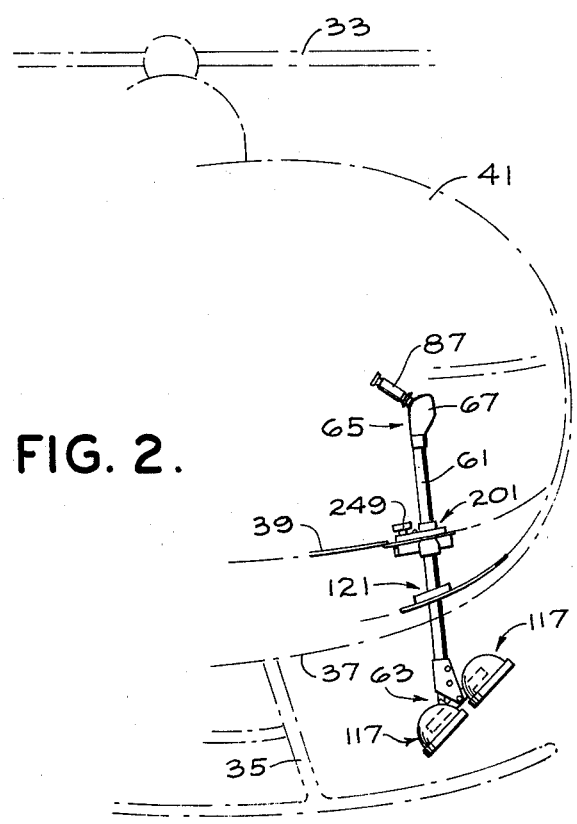
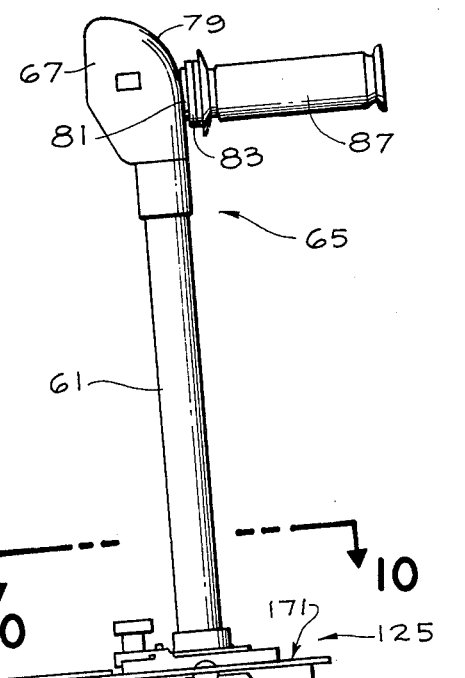

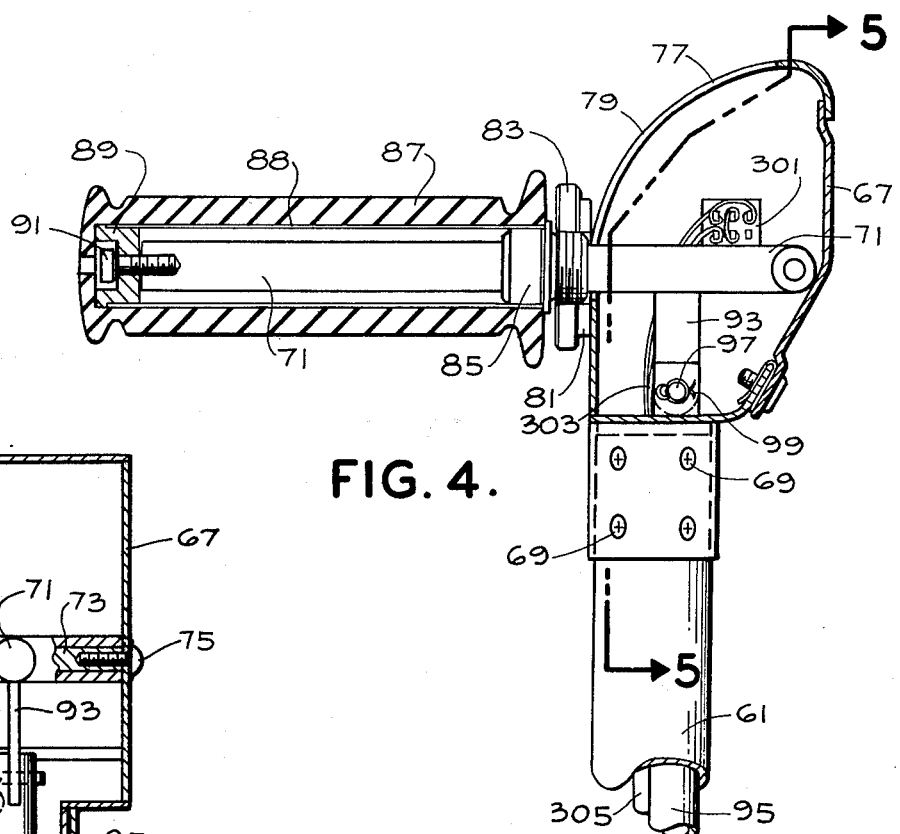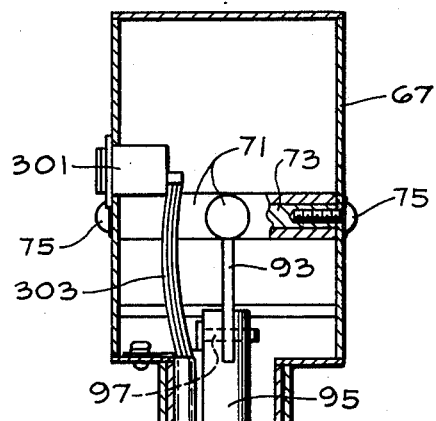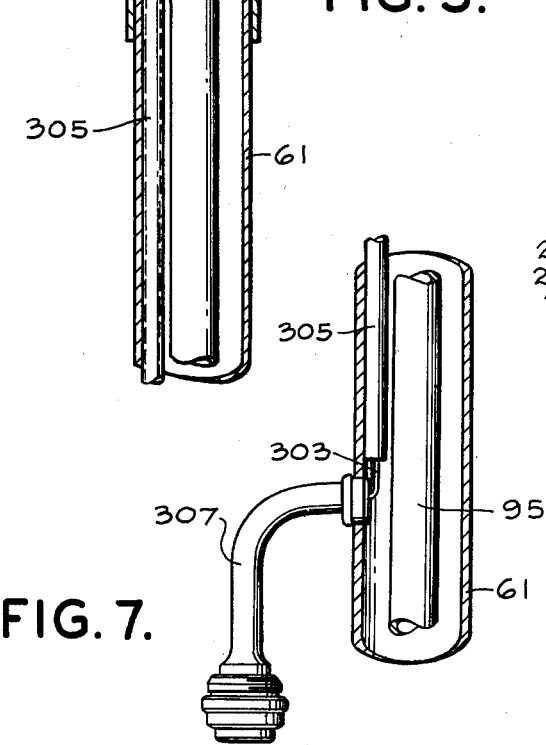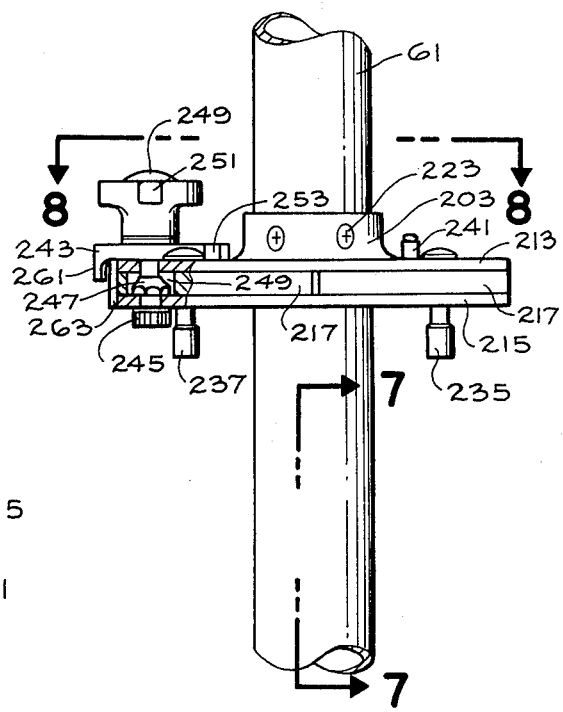

SEARCHLIGHT

BACKGROUND OF THE INVENTION

In the past several years, the use of aircraft, and particularly of helicopters for work in the nature of police protection, aerial search and rescue, etc., has increased very rapidly. In many instances, it is necessary to use these craft at night in areas where there is little or no illumination. For example, it may be necessary to conduct a search and rescue for boaters at sea, campers in remote locations, etc. In such cases, it is usually necessary for the aircraft to be provided with a system by means of which the occupants can illuminate selected portions of the ground which is to be searched.

Such illumination devices sometimes consisted of hand-held lanterns or else floodlights which were rather difficult to control and focus. In this latter category, such structures often comprised lamps mounted on the exterior of the craft which could be controlled from the interior through complex linkages, cables, gear systems, etc. In most instances, control by the operator could be accomplished only with some difficulty in view of the fact that large displacements of the control device would result in small displacements of the lamps, or vice-versa. Consequently, it has often been difficult for an operator to accurately aim the lights, particularly when the aircraft was moving rapidly.

This prior art inability to accurately aim the light could be very dangerous. In cases in which armed criminals or escapees are being sought, it is necessary to aim the lights and turn them on only after they are aimed. If that sequence is followed, the chances of shots being fired at the aircraft are minimized. If the pilot or searchlight controller has a fairly good idea of where the criminal is on the ground, he is not providing a good target until he turns the light on.

Unfortunately, many prior art devices required that the searchlights be aimed by twisting a handgrip which resembles a motorcycle accelerator. This type of system allows only a "rough" aiming, at best, and little or no aiming accuracy can be achieved until after the lights are turned on. Consequently, it has become imperative for the aircraft occupants' safety, in such uses, that very accurate aiming of the searchlights be available prior to lighting the lamps.

Of course, with respect to hand held lights, it is somewhat easier to aim the light, much as one would aim a flashlight, but the degree of illumination of the surface achieved is significantly inferior. This results from the fact that the operator can normally operate only one or two rather small lamps due to the power required and the heat generated. Also, since the light rays must pass through the plastic or glass windows or hulls of the aircraft, the reflection of the light therefrom tends to blind the observer and make it much more difficult to see the surface area being searched.

Accordingly, it has become both necessary and desirable to provide an aircraft mounted searchlight system which will provide a maximum amount of surface illumination. Such a system should be very simple to maintain and operate, allowing the operator to quickly and accurately aim the lamps in a precise manner, even when the aircraft is moving at a high speed. Similarly, it is necessary that the device be used to operate exteriorly mounted lamps so that there will be no reflection of the rays emanating from the lamp into the cockpit, thus preventing the operator from being blinded by his own light. Of course, this desired result will also prevent the light level within the cockpit from becoming so great that it becomes difficult for the pilot to read his instruments.

SUMMARY OF THE INVENTION

The present invention relates to a device which achieves each of the above-described objects, thus providing a structure which overcomes the serious deficiencies of the prior art. Specifically, the present invention relates to a search light or spotlight device mountable on an aircraft or any vehicle; for the sake of convenience, the vehicle will be illustrated and discussed here as a helicopter, although it should be borne in mind that any vehicle, including any type of aircraft, may be employed. The device operates through a linkage having a one-to-one ratio from the operator control device to the lamps themselves. This feature allows the device to be rather simple, while providing the operator with the ease of aiming the lamps as simply and quickly as he would aim a hand-held flashlight. The lamps may be rotated nearly 360° about the axis of the support, while also being pivotable approximately 90° about a horizontal axis substantially perpendicular to the axis of the support. With this structure, the operator can thus rotate the lamps nearly 360° in a vertical plane and approximately 180° about a horizontal axis, thus resulting in an infinite number of positions in which the lamps may be aimed within those limits.

The present invention may preferably be embodied in a hollow or tubular post which may be mounted for rotation within a pair of aligned bearings in the floor and hull, or double hull, of a vehicle. At the end of the tube within the craft, a head member or housing may be fixedly mounted to support control switches and to support and define a path of movement of an operator's control handle.

The operator's handle may be pivotly mounted within the head and also pivotly connected to a control rod which is moved longitudinally through the post due to its attachment to the handle. The control rod may extend beyond the other, i.e., outer, end of the post for pivotal connection to a bracket upon which one or more lamps may be mounted. The bracket may be hingedly connected to the outer end of the post so that, when the operator moves the handle relative to the head, the rod will cause the bracket to pivot about its hinge connection, thus moving the lights about a horizontal axis.

When the operator pushes on the handle to cause the post to rotate, he thereby causes the lamp bracket to rotate to the same degree, thus moving the lights to selected locations around the post axis.

As will now be apparent to those skilled in the art, the present invention may thus be embodied in a very simple structure, if desired, which is relatively inexpensive to produce and substantially maintenance free. Of course, the invention may be embodied in any number of structures, but that which will now be described in detail is presently the preferred embodiment of the invention as defined in the claims.

BRIEF DESCRIPTION OF THE DRAWINGS

FIG. 1 comprises a front elevation of a helicopter upon which the preferred embodiment of the present invention is shown to be mounted with the lamps facing forward;

FIG. 2 comprises a side elevation of the helicopter and searchlight structure illustrated in FIG. 1, with the searchlight structure positioned so that the lamps face forward but are aimed downwardly approximately 45°;

FIG. 3 comprises a side view of the searchlight structure of the preferred embodiment, illustrating the manner in which the structure may be mounted in an aircraft and illustrating the normal structural position when the searchlight is not in use;

FIG. 4 comprises a side elevation, partly in section, of the upper portion of the searchlight structure;

FIG. 5 comprises a sectional view of that structure illustrated in FIG. 4, as seen along a line 5—5 therein;

FIG. 6 comprises a partial plan view of the searchlight structure, and particularly the upper bearing thereof which is located in the aircraft floor;

FIG. 7 comprises a sectional view of a portion of the structure shown in FIG. 6, as seen along a line 7—7 therein;

DETAILED DESCRIPTION

Figure 8:
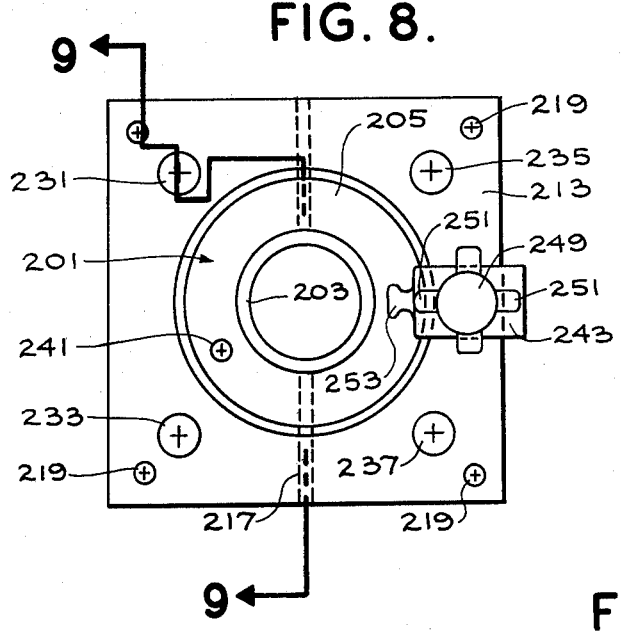
FIG. 8 comprises a plan view of the upper bearing, as seen along a line 8—8 in FIG. 6, but with the view rotated 180°.

As shown in FIG. 1, the present invention may be employed upon any vehicle, such as an aircraft. There is illustrated a helicopter 31 having a rotor 33, landing struts 35, a hull 37, and an interior floor or inner hull 39. Also, the helicopter may be provided with suitable glass or plexiglass hull portions 41 which are transparent so that the aircraft occupants can see out. Although the preferred embodiment is illustrated here as having searchlights located below the vehicle, it will be realized that they may be located above or to the side of the vehicle merely by a simple reversal or other placement of structure.

In any event, the illustrated preferred embodiment comprises a tubular post 61 having an outer or exterior end generally illustrated at 63 and an inner or interior end generally illustrated at 65.

As shown particularly in FIGS. 3-5, the inner end 65 of the post 61 is provided with a head 67 generally comprising a hollow housing which may be suitably fixed to the post by any desired means such as blind rivets 69, brazing, etc.

Within the head 67, a T-shaped lever 71 may be suitably mounted to pivot about the leg which forms the head or short leg of the "T". As illustrated, that leg may be hollow and contain a bearing 73 which is fixed to the housing 67 at either end by a bolt 75. The "vertical" or long leg of the T-shaped lever may extend out of the housing through a slot 77 formed in a curved face 79 of one wall of the housing.

The control lever 71 may be locked into position relative to the curved face 79 by means of a stop element 81 which, preferably, is of flexible material which can be biased into contact against the housing by means of a jamb-lock disk 83. The disk 83 may be turned into contact with the stop 81 by rotating the disk relative to a lock and bearing member 85 upon which the disk may be threadedly mounted. The bearing element 85 may support the control lever 71 and is fixedly attached to the T-shaped lever 71 to support a hand grip or handle 87 by contact with an inner support tube 88. The hand grip, in turn, is suitably connected to the outer end of the lever 71 by frictional contact with the tube 88 which is restrained by an end cap 89. The end cap 89 may be connected to the outer end of the lever 71 by suitable means such as a cap screw 91 which passes through a bearing (not shown) in the end cap.

With this exemplary structure, the handle 87 may be rotated about the axis of the control lever 71 to conveniently accommodate the operator's grip, but the rotation of the handle does not alter or in any way affect the aim of the searchlight being controlled.

Figure 16:
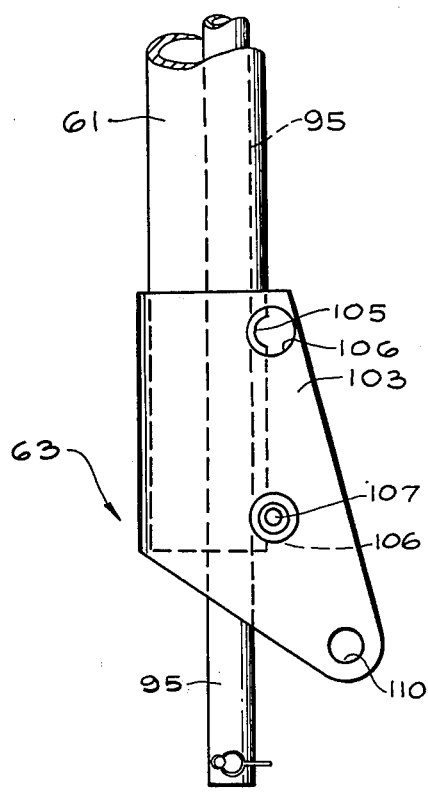
FIG. 16 comprises an elevation view of the hinge support in which the lamp bracket may be mounted with some structure removed for clarity.
Figure 17:
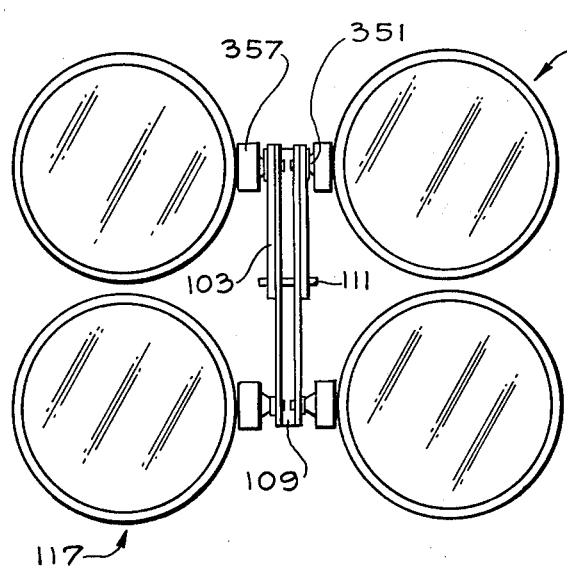
FIG. 17 comprises a front view of a lamp bracket upon which a plurality of lamps may be mounted.
Figure 19:
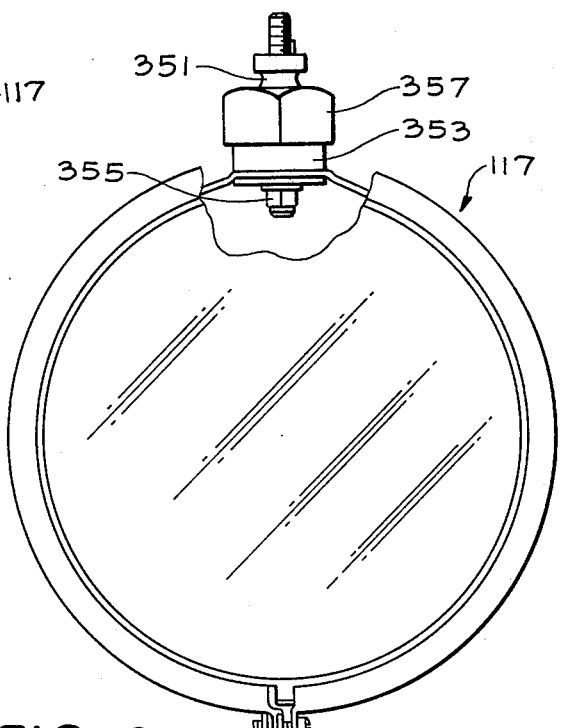
FIG. 19 comprises a front view of a lamp, shown partly in section.

As shown in FIGS. 4 and 5, a tang 93 may be attached to the main or long leg of lever 71 to depend therefrom. Near the lower extremity of the tang, a control link or rod 95 may be connected to the tang by suitable means such as a pin 97 which may be fixed in place, for example, by a cotter pin 99 as shown in FIG. 4. Referring to FIGS. 3 and 16, it can be seen that the control rod 95 may extend completely through the post 61 and beyond the lower or outer end of the post.

At the outer end 63 of post 61, a hinge support or clamp 103 may be suitably fixed to the post 61 by any desired means. It is necessary to pull the support into tight contact with the post 61 to prevent separation due to vibration. In this embodiment, the support 103 may be U-shaped; the post 61 may be provided with one or more notches 105, each of which may be aligned with a set of coaxial apertures 106 in the clamp 103. An expandable bushing 107 may be installed in each set of apertures 106; as they are tightened, they will bear against their respective notches to seat the clamp-hinge support 103 tightly against post 61. Such an expandable bushing has been shown, for example, in U.S. Pat. No. 3,009,747.

As shown in FIG. 3, a lamp bracket 109 may be fastened to the hinge support 103, utilizing the apertures 110 to receive, for example, a pin 111 by means of which the bracket 109 may be pivotally attached to the hinge support 103. Of course, suitable cotter pins (not shown) could be employed to maintain the pin in place, or, alternatively, other structure, such as bolts, could be utilized in place of the pin. In this preferred embodiment in any event, the bracket 109 and hinge support 103 should be firmly fastened together in such a manner that the bracket is allowed to pivot about the axis of any fastening structure employed within the aligned apertures 110.

As shown in FIG. 3, a tang 113 may be mounted on the rear of the bracket and pivotally attached to the control link or rod 95 by any suitable means (not shown). Thus, when the operator moves the handle 87 through an arc about the pivot supports 75, he will thereby cause the bracket 109 to pivot about the pin 111 as the rod 95 exerts an upward force on tang 113. Although movement of the handle 87 will result in a slight radial movement of rod 95, for these purposes we may consider its movement to be exclusively, or substantially, longitudinal or axial.

As seen in the various Figures, one or more lamps, each generally illustrated at 117, may be fixed to the bracket 109 in a manner which will be described below. Thus, since the linkage between the handle 87 and the lamps 117 acts on a 1:1 ratio, it is a very simple matter for an operator to adjust the elevation of the lamps merely by pushing the handle up or down about the pivot bearing 73 in the head 67. In this manner, the operator within the aircraft can adjust the elevation of the lamps when aiming them merely by raising or lowering the handle 87 as illustrated in FIG. 2.

In designing any aircraft, the weight of the elements of the craft are of primary importance since they determine the useful load which can be carried in the craft by any given power plant. Thus, it is usually desirable to construct the aircraft hull of material which is relatively thin and lightweight. Consequently, very few portions of the hull structure are sufficiently strong to withstand the shear loads which might be imposed by even the simple and lightweight structure of the present invention. In order to overcome the hull weakness, it may be necessary in some cases to install a strengthener or doubler plate 123 on the hull in order to support the post 61 and desired electrical components such as sockets, etc.

Figure 15:
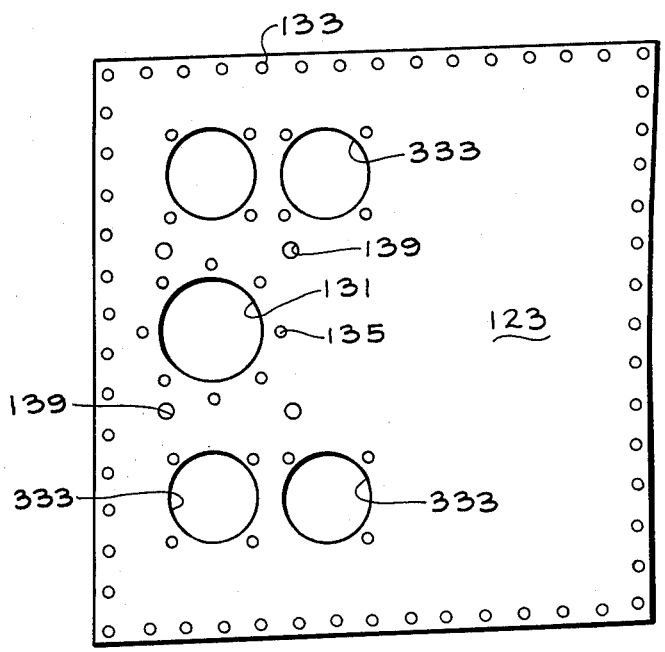
FIG. 15 comprises a bottom plan view of an aircraft hull doubler plate which may be employed to support the lower bearing.

Preferably, the doubler plate 123 should be of such a size that it may be suitably riveted to adjacent hull strengtheners 127 as well as to the hull 37 itself. As shown in FIG. 15, the doubler plate 123 may be provided with an aperture 131 which is coaxially alignable with a similar aperture which may be formed in the hull 37. As can be seen in FIG. 15, a plurality of rivet holes 133 may be provided about the periphery of plate 123 and a plurality of rivet holes 135 may be provided about the post bore 131 in the plate. A similar plurality of apertures corresponding to 133 and 135 may also be formed in the hull so that the plate may be fixedly attached to the hull in such a manner that the bore 131 and the corresponding bore in the hull may be positively located in coaxial relationship so that relative movement between them is positively prevented.

Figure 12:
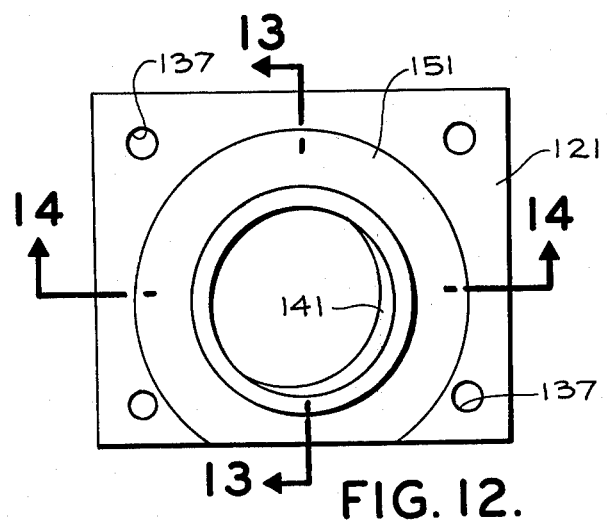
FIG. 12 comprises a bottom plan view of the bottom or lower bearing, as seen along a line 12—12 in FIG. 3.
Figure 13:
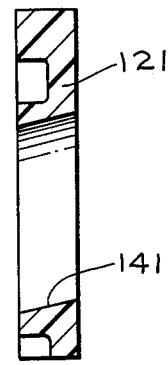
FIGS. 13 and 14 comprise sectional views of the lower bearing illustrated in FIG. 12, as seen along lines 13—13 and 14—14, respectively.
Figure 14:
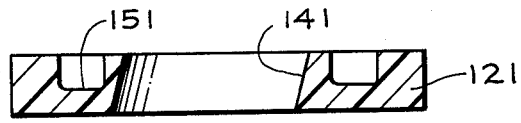

As seen in FIGS. 12-14, a bearing 121 may be provided which, in this preferred form, comprises a substantially flat plate having a plurality of apertures 137 near the periphery thereof for cooperation with coaxially aligned apertures 139 in the plate 123 and similarly aligned apertures in the hull 37 so that the bearing may be fixed to the hull and the doubler plate. As shown, the bearing 121 may include a central aperture 141 through which the post 61 may be passed in sliding relationship. In FIGS. 13 and 14, the bearing surface of the bore 141 may be seen to be formed at any desired angle, relative to the parallel planes of the opposite surfaces of the bearing plate 121, to accommodate the passage of the post 61 and aid in holding the post in its predetermined location relative to the hull.

As stated previously, a plurality of apertures 135 about bore 131 in doubler plate 123 may be utilized to rivet the doubler plate to the hull about the bore 131. In order to allow the bearing 121 to be seated against the hull in the manner illustrated in FIGS. 1-3, it may be desirable, in some cases, to provide a recess or slot 151 in the bottom face of the bearing about the bore so that the heads of the rivets may be accommodated without requiring adjustment of the bearing position. If the bearing 121 is required to be seated closely adjacent a strengthener 127, as illustrated in FIG. 3, the plate may be forshortened in one direction, as illustrated in FIGS. 12 and 13, causing the rivet accommodation slot 151 to intersect the edge of the plate as illustrated.

Figure 10:
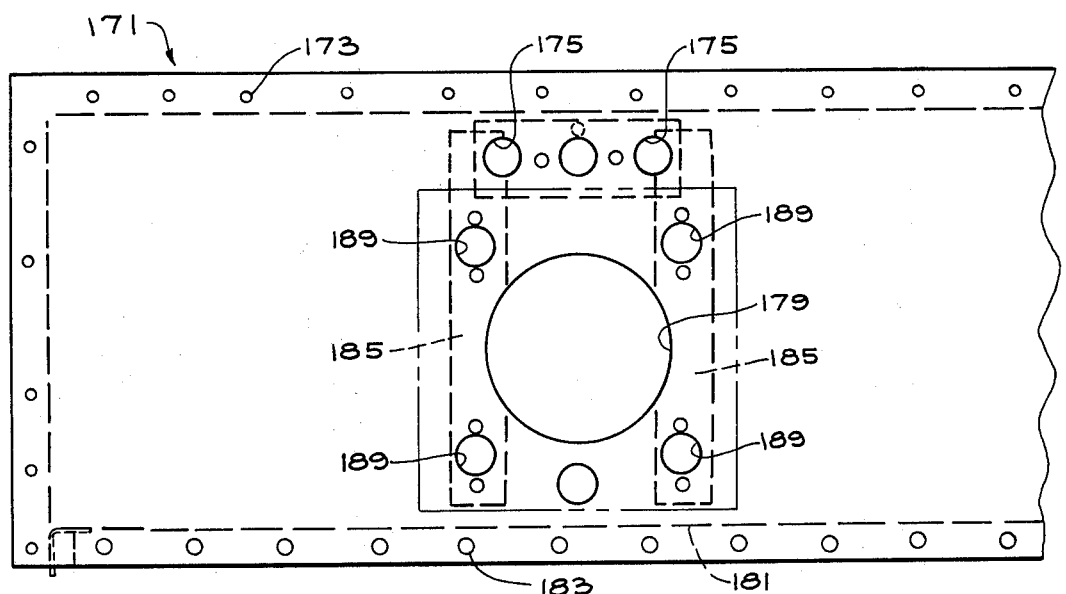
FIG. 10 comprises a partial plan view of a floor plate which may be utilized with the upper bearing, as seen along a line 10—10 in FIG. 3.
Figure 11:
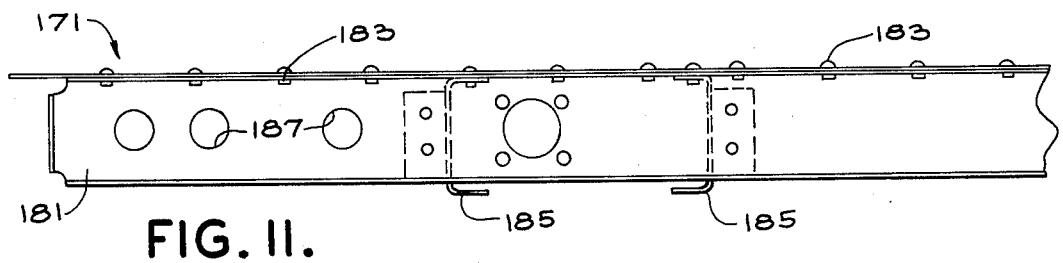
FIG. 11 comprises an elevation of that portion of the floor plate seen in FIG. 10.

In some cases, when it is desired to install a device of this type in an aircraft, it may be necessary to remove some portion or portions of the floor 39 to accommodate the device. If this is done, a floor mounting assembly or plate 171, illustrated in FIGS. 10 and 11, may be mounted in the floor as illustrated in FIG. 3. As shown in FIG. 10, the floor plate 171 may be provided with a plurality of holes 173 about the periphery thereof in order that the plate can be riveted or otherwise fixed to the floor 39 of the aircraft. At the forward portion of the plate, a plurality of apertures 175 may be provided so that circuit breakers may extend upwardly through the plate for actuation by the operator within the aircraft, when necessary. Also, an enlarged aperture 179 may be provided near the center of the plate, through which the post 61 and lower bearing flange 207 (described below) may pass. Referring to FIG. 11, it can be seen that the floor plate 171 may be provided with a long bracket 181 fixed to the bottom thereof by suitable means such a rivets 183 so that the bracket will serve to support and strengthen the plate. For this reason, there may also be provided two relatively short brackets 185, shown extending substantially perpendicular to the long bracket 181 and similarly riveted to the plate 171.

A plurality of apertures 187 may be located in the long bracket 181 to support suitable electrical elements such as fuses which may cooperate with electrical circuitry to protect and operate the lamps 117.

A suitable plurality of apertures 189 may also be located in the plate 171 in order to secure the main section of the upper bearing element 125 which will now be described.

Referring now to FIGS. 6-8, and 9, there is shown a post clamp 201 comprising a collar section 203 which may be formed integral with an upper bearing flange 205 and a lower bearing flange 207. As can be seen from a close inspection of FIG. 9, the upper flange 205 extends radially outwardly to its maximum diameter as indicated at 209. Similarly, the lower flange 207 extends radially outwardly to its maximum diameter as indicated at 211. Thus, it is clear that the lower flange 207 is smaller than the upper flange 205 for a purpose to be described.

Extending radially outwardly from the periphery of the upper flange 205, a top or upper base plate 213 may be provided. Similarly, a bottom or lower base plate 215 may be provided to surround the periphery of the lower flange 207. Of course, the terms "upper," "lower," etc., are used only for the sake of convenience since the structure could be reversed, if desired.

Between the upper and lower base plates 213 and 215, and extending into the space between the flanges 205 and 207, a pair of mating bearing elements or plates 217 may be provided. Basically, each bearing element comprises a rectangular plate constructed of Nylon, Teflon, or other suitable material. Each has a semicircular section cut therefrom along one of the long edges. The radius of that cut may be substantially equal to the outer radius of the collar section 203 between the flanges 205 and 207.

Figure 9:
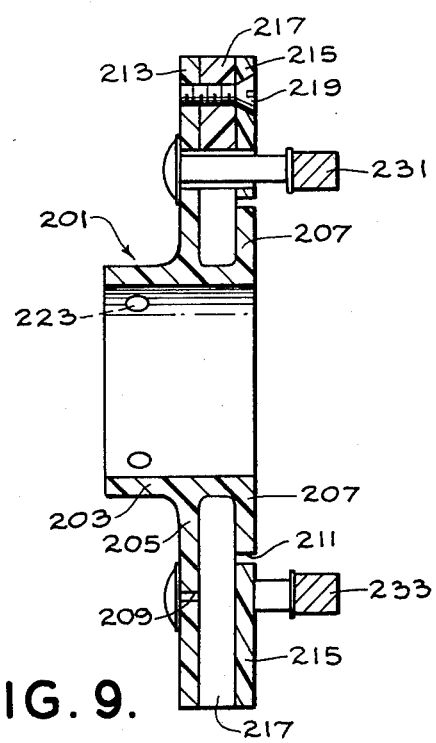
FIG. 9 comprises an enlarged sectional view of the top bearing, taken along a line 9—9 in FIG. 8.

The floor bearing elements or sections 217 cooperate with the flanges 205 and 207 to allow the post 61 to rotate about its axis, while preventing axial movement of the post relative to the bearing. The top and bottom base plates 213 and 215 and the bearing plates 217 may be fastened together by any suitable means, such as screws or bolts 219 as illustrated in FIG. 9.

In FIG. 6, it can be seen that the post 61 may be suitably fastened to the collar 203 by any desired means, such as bolts or rivets 223. The upper bearing 125 may be fixed to the floor plate 171 by means of a plurality of quick release fasteners 231, 233, 235, and 237. Such quick release fasteners may be installed within the apertures 189 of the floor plate 171 in order to hold the entire bearing assembly 125 tightly to the floor plate.

In other words, since bearing assembly 125 is fixed to the helicopter floor plate 171, and since bearing plates 217 extend between the flanges 205 and 207 of post clamp 201 which is fixed to post 61, the post can be rotated about its axis within the bearing but it cannot be moved along its axis.

Since flanges 205 and 207 are of different radii, extending to peripheries 209 and 211, respectively, the weight exerted on the post 61 by the lamps 117, handle 87, etc., will not be transmitted through the bearing plates 217 in a cylindrical plane which is concentric with the post 61.

Instead, any shear forces exerted on the plates 217 will act along a conical plane extending from periphery 209 to periphery 211. Consequently, any gravitational or other forces exerted along the axis of post 61 will tend to force the center sections of the bearing plates, i.e., within the conical plane, toward the outer sections, substantially eliminating any probability of rupture of the bearing plates.

In some cases it may be desirable to prohibit a full 360° rotation of the post in order to prevent the twisting and severing of electrical cables. In such an event, a stop element or pin 241 (FIGS. 6 and 8) may be installed in the upper flange 205 of the post clamp 201 by any suitable means such as a threaded fastening, a press fit, etc. A cooperating stop or brake element 243 may be fixedly attached to the top base plate 213. Such attachment might be accomplished, for example, by installing a bolt 245 (FIG. 6) through the bottom floor base plate 215 and fixedly threading a nut 247 to the bolt on the opposite side of the base within a suitable clearance aperture 249 in the bearing plate 217 on that side of the post. The brake-stop element 234 can then be inserted over the bolt 245 and a knob 249, having finger grip aids 251, may then be threaded onto the end of the bolt in order to hold the stop-brake in place. At the inner periphery of the brake, an abutment element 253 may be provided which will cooperate with the pin 241 to stop and prohibit further rotational movement of the collar 203 about its axis when the pin hits the abutment device 253. If desired, brake 243 may be provided with a friction material (not shown) which bears against the adjacent surface of flange 205, allowing the structure to be locked in any azimuth position desired.

The stop 243 may have a finger 261 depending therefrom as shown in FIG. 6. The inner surface of that finger may be curved slightly to cooperate with a rubber stop element 263 which may be fixed to the outer periphery of the plate and bearing assembly by any suitable means, such as a cement. Consequently, when pin 241 contacts the abutment 253, the brake element 243 will pivot slightly about the axis of the bolt 245, thereby taking up a major portion of the shock associated with any sudden stop when the post is rotated in either direction.

With the structure thus far described, those skilled in the art will now realize that the present invention allows the post 61 to be rotated about its axis, thereby allowing the bearing of the lamps 117 to be adjusted in nearly a 360° circle. Similarly, the elevation of the lamps can be adjusted as previously described by elevating the handle 87 about the axis of rotation of the lever 71 within the head 67. Thus, it is only necessary for the operator to point the handle 87 at the object he desires to see to accomplish an accurate illumination. This is comparable to aiming a flashlight in both speed and ease.

In usage such as police work, a helicopter pilot will locate the craft in the vicinity of the object being sought. The operator of the searchlight will release the lock 81, 83 and loosen knob 249 and then aim the handle 87 at the precise spot he wishes to illuminate. When the handle is aimed, the operator may then turn on a switch 301 (FIGS. 4 and 5) which will actuate a relay of any well-known type on the undersurface of the floor plate 171. The switch may be connected to such electrical structure by means of wires 303 which pass through a conduit 305 located within the post 61 and terminating adjacent the entrance of a wire harness 307 (FIG. 7).

Figure 18:
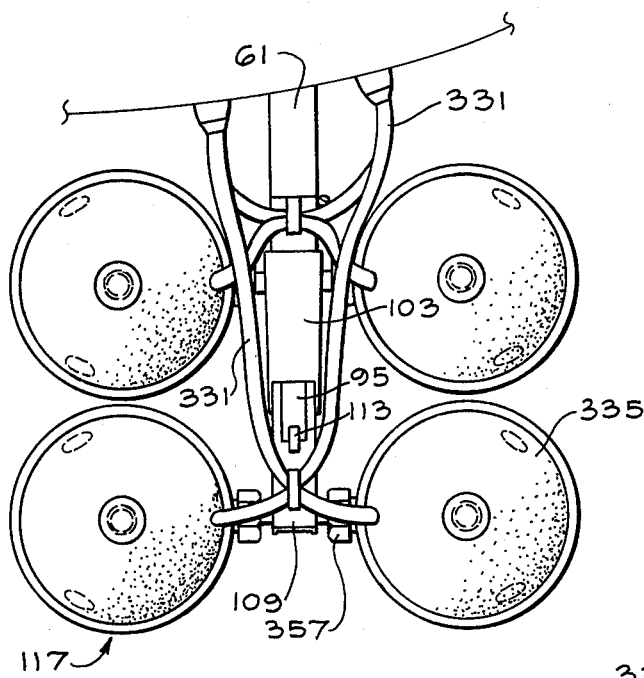
FIG. 18 comprises a rear view of the structure illustrated in FIG. 17.

Each lamp 117 may be similarly connected to such well-known electrical service equipment by an individual wiring harness 331 which may be gathered and arranged in any suitable manner, such as that shown in FIG. 18. Each wiring harness may be pluged into a socket which may be suitably arranged within bores 333 in the hull and doubler plate 123 shown in FIG. 15.

Figure 20:
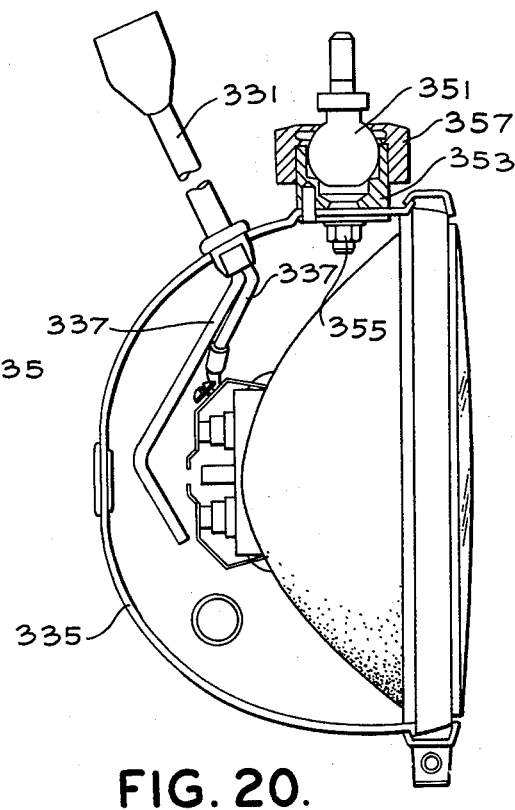
FIG. 20 comprises a side sectional view of a lamp, illustrating its electrical and mechanical connections.

As illustrated in FIG. 20, each wiring harness may be fixed to a lamp housing 335 by any suitable means such that power cables 337 may be operatively connected to each lamp for actuation thereof to provide illumination.

In order to provide a simple means by which each lamp may be aligned with respect to the bracket 109 and any other lamps mounted on the bracket, a ball element 351 may be suitably attached to the bracket, such as by threading, nuts, etc. The ball may be seated within a socket 353 which may be fixedly attached to the lamp housing by any suitable means such as a stud and nut combination 355. A socket nut 357 may be threaded to the socket to tightly seat the ball therein and thus prevent relative movement between the socket and the ball until the nut is again backed off for maintenance, replacement, etc., of the lamp.

Having now completed a review of this detailed description and the accompaning drawings, those skilled in the art will realize that the present invention provides a relatively simple, economical, and very useful searchlight such as might be used on an aircraft. This novel structure allows an operator to aim the lamps at a precise object or area before he turns them on, while allowing him to have complete confidence that the lamps are aimed precisely at the location at which he has pointed the control handle. Of course, the present invention may be embodied in a wide variety of structures, many of which may not even resemble the preferred embodiment illustrated in these drawings. Nevertheless, those additional embodiments will enjoy the advantages of the invention as taught by this disclosure and defined in the following claims.

I claim:

1. A searchlight apparatus mountable on a vehicle comprising
    first bearing means fixedly mountable on a floor of a vehicle,
    second bearing means fixedly mountable on the hull of a vehicle,
    tubular means extending through and beyond said first and second bearing means for rotation relative thereto and having
    a first end on the side of said first bearing means distal from said second bearing means,
    a second end on the side of said second bearing means distal from said first bearing means,
    head support means fixedly mounted on said first end of said tubular means, and
    hinge support means fixedly mounted on said second end of said tubular means,
    bracket means attached to said hinge support means for pivotal movement relative to said hinge support means,
    link means extending through said tubular means into said head means at said first end of said tubular means and pivotally attached to said bracket means at said second end of said tubular means,
    means operatively attached to said link means in said head means and extending out of said head means for actuation of said link means by an operator, and
    lamp means mounted on said bracket means for movement about the axis of said hinge support means as said actuation means is actuated by an operator to move said link means longitudinally in said tubular means and for movement about the axis of said tubular means as said actuation means is actuated by an operator to rotate said tubular means about its axis.

2. The apparatus of claim 1 wherein
said first bearing means includes
    post clamp means attached to said tubular means,
    bearing plate means located in planar abutment with said post clamp means for relative rotation therebetween,
    upper base plate means surrounding a first portion of said post clamp means,
    lower base plate means surrounding a second portion of said post clamp means, said bearing plate means fixed in planar abutment with said upper and lower base plate means, and
    means for holding said upper and lower base plate means and said bearing plate means in fixed relation to the vehicle floor.

3. The apparatus of claim 1 wherein
said first bearing means comprises
    a post clamp fixed to said tubular means and having
        an upper radial flange and
        a lower radial flange,
    bearing plate means located between said upper and lower radial flanges to allow relative rotation between said post clamp and said bearing plate means while prohibiting axial movement of said tubular means, and
    means for fixing said bearing plate means relative to said vehicle.

4. The apparatus of claim 3 wherein
said upper and lower radial flanges are of unequal radii to prohibit shearing forces generated by and exerted upon said apparatus from beng exerted in a cylindrical plane across said bearing plate means.

5. The apparatus of claim 3 including
abutment means operatively located with respect to the vehicle and said tubular means for limiting rotational movement of the latter relative to the former.

6. A control apparatus comprising
    means for fixing said apparatus to a structure upon which said apparatus is to be mounted,
    tubular means mounted in said fixing means for rotation of said tubular means about its axis,
    rod means moveably mounted in said tubular means and extending beyond the ends thereof,
    mounting means moveably fixed to said rod means and to said tubular means at a first, adjacent end of each thereof,
    controlled means fixedly mounted on said mounting means,
    control means moveably fixed to the second end of said rod means and including
        an operator-actuatable handle,
    pivot means operatively connected to said handle and fixed to said tubular means for limiting movement of said handle to a fixed path of oscillation, and
    attachment means operatively connected to said handle for generally axial movement of said rod means when said handle is moved by an operator along said fixed path, thereby generating movement of said mounting means and said controlled means.

7. The apparatus of claim 6 wherein
said fixing means includes
    bearing means for rotatably supporting said tubular means and including
        means for prohibiting axial movement of said tubular means relative to a structure upon which said apparatus is to be mounted.

8. The apparatus of claim 7 wherein
said bearing means further includes
    means for distributing shear forces exerted on said bearing means by said tubular means along a conical plane in said bearing means which becomes narrower in the direction of usual shear force application.

9. The apparatus of claim 6 including
    means for adjustably mounting said controlled means on said mounting means including
        socket means fixed to one of said mounting means and said controlled means,
        ball means fixed to the other of said mounting means and said controlled means, and
        means for releasably fixing said ball means within said socket means.

10. Apparatus for controlling an illumination device comprising
    mounting assembly means for moveably fixing said apparatus to a relatively fixed structure,
    a tubular means located in said mounting assembly for rotation about its axis,
    rod means extending through said tubular means for axial movement therethrough, bracket means pivotally attached to said rod and tubular means at an adjacent one end of each thereof, manually actuatable means attached to said rod and tubular means adjacent the other end of each thereof, and illumination means fixedly attached to said bracket means for pivotal movement with said bracket means in a 1:1 relationship with respect to movement of said manually actuatable means by an operator.

11. The apparatus of claim 10 including means fixed to said tubular means, near the end thereof distal from said bracket means, for pivotally mounting said manually actuatable means in such a manner as to limit movement of the latter within a predetermined range of vertical oscillation and horizontal rotation about the axis of said tubular means.

12. The apparatus of claim 10 including bearing means mountable on the hull of a vehicle to which said apparatus may be attached.

13. The apparatus of claim 10 wherein said mounting means includes bearing plate means attachable to the floor of a vehicle to which said apparatus may be attached, and means fixed to said tubular means for cooperation with said bearing plate to support said tubular means for rotation about is axis.

14. The apparatus of claim 13 wherein said mounting assembly means further includes means for imposing all shear forces directed along the axis of said tubular means along a conical plane within said bearing plate means which narrows in the direction in which shearing forces are normally applied thereagainst.

15. A searchlight apparatus which may be mounted on a helicopter having a hull and a passenger compartment floor within the hull comprising first bearing means fixedly mountable on the floor of a helicopter, second bearing means fixedly mountable on the hull of a helicopter, tubular means located within and passing through said first and second bearing means, said tubular means having a first end extending beyond said first bearing means to a position within the passenger compartment of a helicopter and a second end extending beyond said second bearing means to a position exterior to the hull of a helicopter, and head means fixedly mounted on said first end of said tubular means and having pivot support means thereon, bracket support means fixedly mounted on said second end of said tubular means, bracket means pivotally mounted on said bracket support means and having at least one lamp mounted on said bracket means, rod means extending through said tubular means, pivotally attached to said bracket means, and pivotally attached to an operator control means pivotally mounted in said head means, operator control means pivotally mounted on said pivot support means in said head means and pivotally attached to said rod means including a control handle which may be pointed at an object to be illuminated, thereby causing said at least one lamp to be rotated and elevated so as to be aimed at the object.

16. The apparatus of claim 15 wherein at least one of said first and second bearing means includes means for supporting said tubular means for rotation about its axis while prohibiting axial movement thereof.

17. The apparatus of claim 16 wherein the other of said first and second bearing means includes means for supporting said tubular means against radially directed movement thereof.

18. The apparatus of claim 16 wherein said supporting means comprises means fixed to said tubular means and having a first flange and a second flange spaced from and substantially parallel to said first flange, one of said flanges having a larger radial dimension than the other, bearing plate means within the space between said flanges and extending outwardly therefrom, and means for fixing said bearing plate relative to a helicopter upon which said apparatus may be mounted.

19. A searchlight apparatus comprising tubular post means having post clamp means mounted thereon and including an upper flange of a first, larger radial dimension, a lower flange of a second, smaller radial dimension, and a bearing-receiving space of predetermined size between said upper and lower flanges, first bearing means for locating and supporting said tubular post means for rotation about its axis comprising an upper plate, a lower plate, a pair of mating bearing plates locatable between and fixed to said upper and lower plates, said bearing plates located within said bearing-receiving space for supporting cooperation with said upper and lower flanges, and means for fixing said first bearing means to a fixed surface, housing means mounted on one end of said tubular post means and including pivot support means and lamp switch means, lamp bracket means pivotally mounted near the other end of said tubular post means and including lamp means mounted thereon, rod means extending through said tubular post means and pivotally attached to said lamp bracket means, manual control means mounted on said housing pivot support means for movement about said pivot support means and having means pivotally attached to said rod means for longitudinal movement of the latter through said tubular post means, and means interconnecting said lamp switch means and said lamp means for selectively illuminating the latter.

20. The apparatus of claim 19 including means for limiting the movement of said tubular post means within a predetermined angle of rotation about its axis.

21. The apparatus of claim 19 including
means for selectively locking said manual control means relative to said housing to temporarily prohibit alternation of the elevation of said lamp means.

* * * * *